United States Patent [19]

McKissick et al.

[11] Patent Number: 4,717,583

[45] Date of Patent: Jan. 5, 1988

[54] MATERIAL AND PROCESS FOR RETOUCHING OFFSET PLATES

[76] Inventors: Gregory L. McKissick, 543 N. 44 West Ave., Tulsa, Okla. 74127; James L. Orcutt, 5410 Denton Pl., Madison, Wis. 73711

[21] Appl. No.: 21,177

[22] Filed: Mar. 3, 1987

Related U.S. Application Data

[62] Division of Ser. No. 772,614, Sep. 4, 1985, abandoned.

[51] Int. Cl.[4] ........................ B41M 5/26; A46B 11/08; B32B 35/00; G03C 5/00

[52] U.S. Cl. ...................................... 427/11; 101/466; 401/1; 427/140; 430/302; 430/329; 524/605

[58] Field of Search .......................... 427/11, 429, 140; 430/302, 329; 524/605; 401/1; 101/466

[56] References Cited

U.S. PATENT DOCUMENTS

| | | | |
|---|---|---|---|
| 4,150,623 | 4/1929 | Hamilton | 401/1 X |
| 4,396,703 | 8/1983 | Matsumoto et al. | 430/302 |

*Primary Examiner*—Michael R. Lusignan

*Attorney, Agent, or Firm*—Ray G. Wilson

[57] ABSTRACT

A material is provided for adding image areas to grained lithographic offset plates. A polyester resin with imbedded fibers changes the surface characteristics of the printing plate from an oily ink repellant condition to an oily ink receptive condition. In a preferred embodiment, a resin of PBT or PET is provided in generally solid form which may be shaped to a desired form for application to the plate. Corrections may be made to a plate either on or off a printing press and at any stage of the print run.

3 Claims, 1 Drawing Figure

MATERIAL AND PROCESS FOR RETOUCHING OFFSET PLATES

This is a divisional application of pending prior application Ser. No. 772,614 filed on Sept. 4, 1985, now abandoned.

FIELD OF INVENTION

This invention relates to a retouching agent and its application for offset printing plates, in particular, to an agent and method which can be used to add an image area to a developed offset plate.

BACKGROUND OF INVENTION

Offset printing plates generally define two surface conditions: an oily ink receptive/fountain solution (or dampening water) repellent condition defining the pattern to be printed and an oily ink repellent/fountain solution (or dampening water) receptive condition. Fountain and dampening solutions are mildly acidic solutions used to keep the non-imaging areas of the printing plate free from scumming or tinting, i.e., free from becoming ink receptive.

An image produced by an offset printing plate can be altered by changing the surface from one condition to another. U.S. Pat. No. 4,396,703 teaches an acidic retouching agent which acts to delete an image area from a lithographic printing plate having a hydrophilic surface. A viscous fluid is applied to the areas of the plate on which an image is to be deleted. It will be appreciated that application of a liquid is not easily controlled and is not suitable for detailed corrections.

In a process for adding image areas to a metal printing plate, an electrical arc is produced between a graphite electrode and the plate, where the arc first scores the plate and then deposits carbon on the etched surface area to form additional oily ink receptive areas. This arcing retouch process produces inconsistent results, both in initial image quality and image longevity, i.e., the number of print impressions an image area can produce before it begins to lose its oily ink receptivity with the printed image appearing progressively weaker and/or faded on each successive print impression. There is also a concomitant loss of productivity due to the time required in setting up and removing the graphite anodes and the need to remove the plate from the printing press in the preferred process. Further, the transformer, wires, connectors, etc. associated with the device provide a cumbersome apparatus.

There are also corrections which cannot be made. For example, a straight line cannot be accurately drawn since the electrical arcing between the pencil and the plate has the deleterious effect of scoring the plate in areas outside the area to be modified, rendering those areas to be oily ink receptive and ruining the entire plate.

In yet another process for adding image areas to a printing plate, a caustic liquid is dispensed from a cylindrical container with a felt or similar material tip, such as is commonly used for colored marking pens. The liquid dries on the surface of the printing plate, to produce an oily ink receptive area. The effects of the caustic liquid are also inconsistent in both initial image quality and image longevity. Further, the caustic liquid produces a strong, disagreeable odor and there is some danger associated with the use of a caustic liquid. Due to liquid spreading, it is difficult to use the process for intricate or detail work or where an amount of image bleed or travel is unacceptable.

These and other problems are overcome by the present invention and an improved material is provided in a process for adding image areas to offset printing plates.

SUMMARY OF THE INVENTION

In a preferred embodiment of the present invention, a material is provided for retouching selected surface areas of a printing plate effective to render the surface oily ink receptive. A thermoplastic polyester resin has been found to provide the desired surface receptivity. A fiber material is imbedded in the resin in a concentration effective to adhere to the resin. The fiber material increases the duration of the printing run over which the added image area obtains satisfactory quality.

A method is thus available for retouching offset printing plates which does not require removal of the plate from the printing press. An applicator is formed of a solid polyester, which includes PBT and/or PET, and a fiber loading is selected for the printing run. The applicator is then rubbed over the surface of the printing plate in a pattern which corresponds with the desired corrections. Polyester resin and fibers are transferred to the printing plate to provide the desired image addition.

These and other characteristics of the present invention will become apparent from the following detailed description, wherein reference is made to the figure in the accompanying drawing.

IN THE DRAWING

The Figure is a pictorial illustration of using one embodiment of the retouching material according to the present invention.

DETAILED DESCRIPTION

Figure 1:
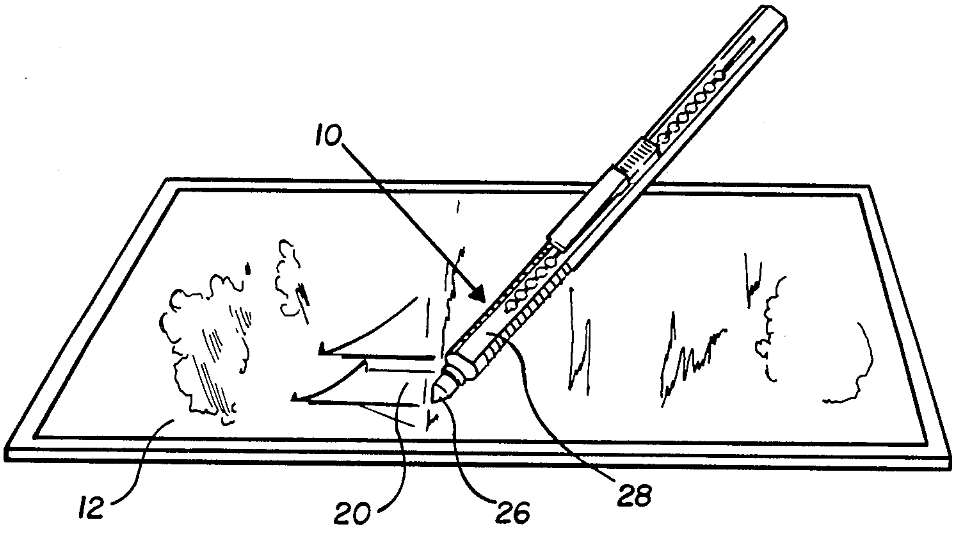

An improved material is provided for adding an image area, an oily ink receptive/fountain solution (or dampening water) repellent area, to offset printing plates. This material has been shown to provide the following characteristics:

1. Consistent, predictable, reliable results from each application;

2. Longevity of oily ink receptivity in the applied area (print image longevity) commensurate with the longevity of the oily ink receptivity of the normally developed print areas of the printing plate;

3. Safety in storage, usage, including non-toxicity, odorlessness and posing no health nor environmental concerns;

4. Available in a readily and easily applied format, suitable equally to retouching a plate on or off a press, either before, during, and/or after a production run;

5. No limitation as to size, type or number of image areas which are retouchable or producible (e.g., straight lines, detail work, block areas, broken letter repair, etc.);

6. Allows for re-shaping the contact surface by the end user;

7. Viability of use in a defined area of a plate without the problem of run or bleed into adjoining areas;

8. Full compatability with a diversity of proprietary plate emulsions and surfaces, rendering the agent fully effective for use with any known brand of offset plate.

It has been found that these characteristics can be obtained from a retouching agent selected from a family of plastic resins. More particularly, thermoplastic polyester resins selected from the Polyethylene Terephthalate (PET) family of resins and the Polybutylene Terephthalate (PBT) family obtain these characteristics. Further, by embedding a fiber material in members of the families of resins, the ability to meet the characteristics is enhanced. Specifically, a material comprised of a thermoplastic polyester PBT resin with about 40% glass fiber embedded in the resin has been used to produce an oily ink receptive area (image area) on a developed, grained, aluminum, subtractive, lithgraphic, offset printing plate equivalent to the image area of an unretouched plate.

During an extensive testing period using a variety of presses, plates, inks and fountain solutions, the material obtained print images from the retouched plate areas which were consistently bright and unfaded throughout production runs ranging from 5,000 impressions to over 25,000 impressions. These retouched images were indistinguishable in tone, color, density, and quality of image from the printed images corresponding to the normally developed image areas of the plate.

During testing the agent was applied to developed plates at a variety of times during the printing process: before installation on a press; after installation but before initial production was begun; during production by stopping the press, applying the agent and resuming production; and by interrupting the production, removing the plate from the press, applying the agent, reinstalling the plate, and resuming production. In every instance, the results were identical: the retouched plate obtained all of the desired characteristics from the retouched area.

An exemplary embodiment of an applicator for retouching printing plates consists of a thermoplastic polyester resin selected from the PBT and PET families, with about 40% (by weight) glass fiber content. Other resin and fiber combinations have been tested which also obtain certain of the desired characteristics. Thus, it is to be understood that the retouching material may be formed generally from members of the polyester PBT and PET families, either individually or in conjunction with one another, including those which are not thermoplastic, those which require curing or processing through the addition of a catalyst, those which exist in other than a solid form (such as liquid or powder), but which are or can be converted to a solid by application of an appropriate process, as well as those resins which are an admixture of more than one resin, provided at least one of the resins of the admixture is from the polyester family.

Further, while a 60% resin/40% embedded glass fiber admixture seems an optimal weight ratio, the material herein may be comprised in a range of fiber contents, said range extending from zero to a ratio of resin to fiber beyond which the resin and fiber will no longer effectively adhere to one another either singly or in combination. It will also be appreciated that other fibers may be used where the fibers and the resin form an adherent mixture. For example, fibers may be formed from carbon, spun carbon, silicate, ceramics and/or their derivatives.

A particularly suitable embodiment of the above retouching material is in a solid stick-like form which can be readily grasped for application to a printing plate. A coloring agent may be included in the material to provide visible evidence of the areas of the plate which have been retouched and to assist the operator in obtaining a desired design.

TABLE A presents comparative qualitative results of the image quality provided by a grained plate area which was retouched using the listed composition with that image quality provided using the preferred retouching material of 40% fiber/60% PBT resin. The comparative cycle run was greater than 4000 impressions and the preferred composition showed little, if any, degradation in image quality.

TABLE A

| | |
|---|---|
| 1. ABS plastic with 20 w/o fiber | No image produced |
| 2. WF 1004 (a PBT resin mixture with polytetrafluoroethylene) with 20 w/o fiber | Strong initial image with some reduction in image strength over cycle |
| 3. PBT resin with 20 w/o fiber | Strong initial image with moderate reduction in image strength after about 3000 impressions |
| 4. Polystrene with no fiber | Weak initial image; disappeared after about 50 impressions |

As shown in the Figure, the retouching material herein described may be used with particular advantage for adding an image area to printing plates, in particular those plates known in the industry generically as grained, aluminum, subtractive lithographic offset plates. Further, the above-described printing plates may be anodized or non-anodized, one-sided or two-sided. As shown in FIG. 1, retouching device 10 is provided with resin/fiber rod 26 contained within rod holder 28. Rod holder 28 is gripped by user 16 for direct application of rod 26 to printing plate 12.

The following process is a general method for application of the retouching material described herein:

1. The area of plate 12 to which the material in rod 26 is to be applied is cleaned with water, e.g., by wiping with a damp cloth.
2. The area is dried, e.g., by wiping with a dry cloth.
3. The resin/fiber rod 26 is applied to plate 12 by dragging or rubbing rod 26 over the surface in the pattern 20 desired to be added, using light to medium pressure to transfer some of the plastic resin/fiber of rod 26 to the plate 12 surface.
4. Oily printers ink is then dabbed over the area 20 where the resin/fiber from rod 26 has been transferred, e.g., by fingertip application.
5. Production proceeds as normal.

Area 20 of printing plate 12 so treated is now oily ink receptive, providing a corrected image of area 20 which will print during production as well as a normally developed image area on the plate. As described herein, the preferred retouching material produces printed images which are equal in quality to those images produced from the normally developed areas of the plate. The durability of these retouched images has exceeded the durability requirements of various production runs (e.g., 5,000; 10,000; 15,000; 25,000 impressions and more) and operated without any significant loss in image quality, density, color or clarity for up to 45,000 impressions.

The retoucing agent of this invention exhibits several advantages, some of which are presented below:

1. The retouching material of this invention produces an oily ink receptive/fountain solution (or dampening water) repellent condition of any area of a developed, subtractive, grained, aluminum, lithographic, offset plate which was previously in an oily ink repellent-/fountain solution (or dampening water) receptive condition. This reversal of the surface characteristics allows for the transfer of an image from the plate onto the printed medium (such as paper stock) from an area which previously produced no image.

2. The image area which is produced by the material exhibits a durability which is commensurate with the durability of the normally developed image areas on the plate.

3. The quality of the image which appears on the printed material (such as paper stock) is indistinguishable from the image produced from the normally developed image areas of the plate.

4. The retouching material consistently obtains the above characteristics under a variety of working conditions and on a variety of proprietary plates, emulsions, fountain solutions, inks, equipment, personnel, etc.

5. The retouching material is inert, non-volatile, odorless, non-toxic, and presents no special handling requirements, safety precautions or environmental concerns.

6. The retouching material does not require use of additional equipment, accessories, space requirements, drying time or the like, requiring only water as a cleaning agent, as described earlier.

7. The retouching material is ready for a production run immediately upon application, requiring no additional time to set, dry, cure, etc.

8. The retouching material does not run, bleed, or otherwise intrude into areas to which it was not directly applied.

9. The retouching material is not limited to any size, type or number of image areas which can be retouched.

10. The retouching material may be shaped by an end user (using commonly available tools such as a file, rasp, knife, etc.), into a contact surface shape effective for the design changes to be made.

11. The retouching material is further useful for drawing any mark, sign, symbol or signature directly on the plate which may then be printed from the plate to the printed material.

The retouching material herein is, thus, a versatile tool for the printing industry and in particular the prep and press departments, for reducing costs and improving productivity.

As many possible embodiments may be made of this invention without departing from the spirit or scope thereof, it is to be understood that all matters herein set forth and in the accompanying drawing are to be interpreted as illustrative and not in any limiting sense.

What is claimed is:

1. A method for correcting an offset printing plate, comprising the steps of:

forming a solid polyester resin applicator with a selected fiber loading, and rubbing said applicator on said printing plate to transfer said resin and fibers to said plate in correspondence with a correction to be made.

2. A method according to claim 1, further including the step of shaping a portion of said applicator to a configuration effective to form said correction on said printing plate.

3. A method according to claim 2, including the step of selecting said fiber loading in an amount effective to adhere with said resin.

* * * * *